United States Patent [19]

Hellhake

[11] Patent Number: 5,877,755

[45] Date of Patent: *Mar. 2, 1999

[54] INTERACTIVE BROADBAND MULTIMEDIA SYSTEM

[75] Inventor: Paul Hellhake, Dowington, Pa.

[73] Assignee: FutureVision of America Corp., W. Conshohocken, Pa.

[*] Notice: This patent issued on a continued prosecution application filed under 37 CFR 1.53(d), and is subject to the twenty year patent term provisions of 35 U.S.C. 154(a)(2).

[21] Appl. No.: 703,109

[22] Filed: Aug. 22, 1996

Related U.S. Application Data

[63] Continuation of Ser. No. 567,722, Dec. 5, 1995, abandoned, which is a continuation of Ser. No. 255,678, Jun. 8, 1994, abandoned.

[51] Int. Cl.[6] ........................................ H04N 7/14
[52] U.S. Cl. .................. 345/327; 348/7; 348/12; 348/13; 455/5.1; 393/200.49
[58] Field of Search .................. 348/6, 7, 8, 10, 348/11, 12, 13; 455/3.1, 3.2, 3.3, 4.1, 4.2, 5.1, 6.1, 6.2, 6.3; 345/326, 327; 395/200.47–200.49; H04N 7/16, 7/169, 7/173

[56] References Cited

U.S. PATENT DOCUMENTS

| | | | |
|---|---|---|---|
| 4,745,559 | 5/1988 | Willis et al. | 364/514 |
| 5,014,125 | 5/1991 | Pocock et al. | 348/7 |
| 5,093,718 | 3/1992 | Hoarty et al. | 348/7 |
| 5,192,999 | 3/1993 | Graczyk et al. | 358/85 |
| 5,220,420 | 6/1993 | Hoarty et al. | 358/86 |
| 5,233,346 | 8/1993 | Minerd et al. | 340/825.52 |
| 5,357,276 | 10/1994 | Banker et al. | 348/7 |
| 5,410,343 | 4/1995 | Coddington et al. | 348/7 |
| 5,528,281 | 6/1996 | Grady et al. | 348/7 |
| 5,570,126 | 10/1996 | Blahut et al. | 348/7 |
| 5,608,447 | 3/1997 | Farry et al. | 348/7 |
| 5,625,404 | 4/1997 | Grady et al. | 348/7 |
| 5,635,979 | 6/1997 | Kostreski et al. | 348/13 |
| 5,712,906 | 1/1998 | Grady et al. | 348/12 X |
| 5,754,784 | 5/1998 | Garland et al. | 395/200.49 |

Primary Examiner—Andrew I. Faile
Assistant Examiner—John W. Miller
Attorney, Agent, or Firm—Seidel, Gonda, Lavorgna & Monaco, PC

[57] ABSTRACT

A method and apparatus for facilitating interactive television is disclosed. The method for facilitating interactive television comprises the following steps: accessing an interactive program; executing said interactive program; and providing an end user with a set of coded instructions which may be transmitted upstream.

20 Claims, 8 Drawing Sheets

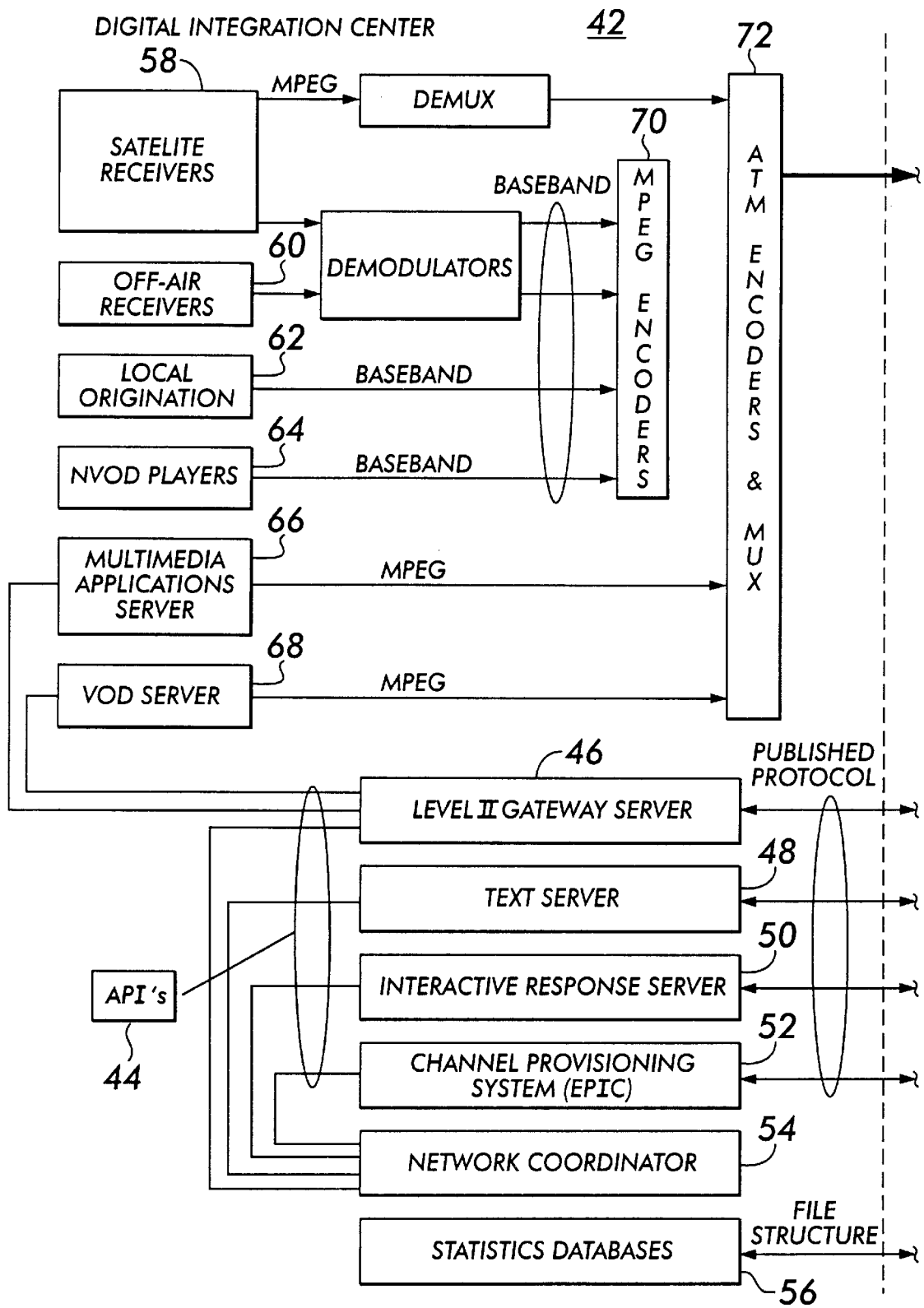

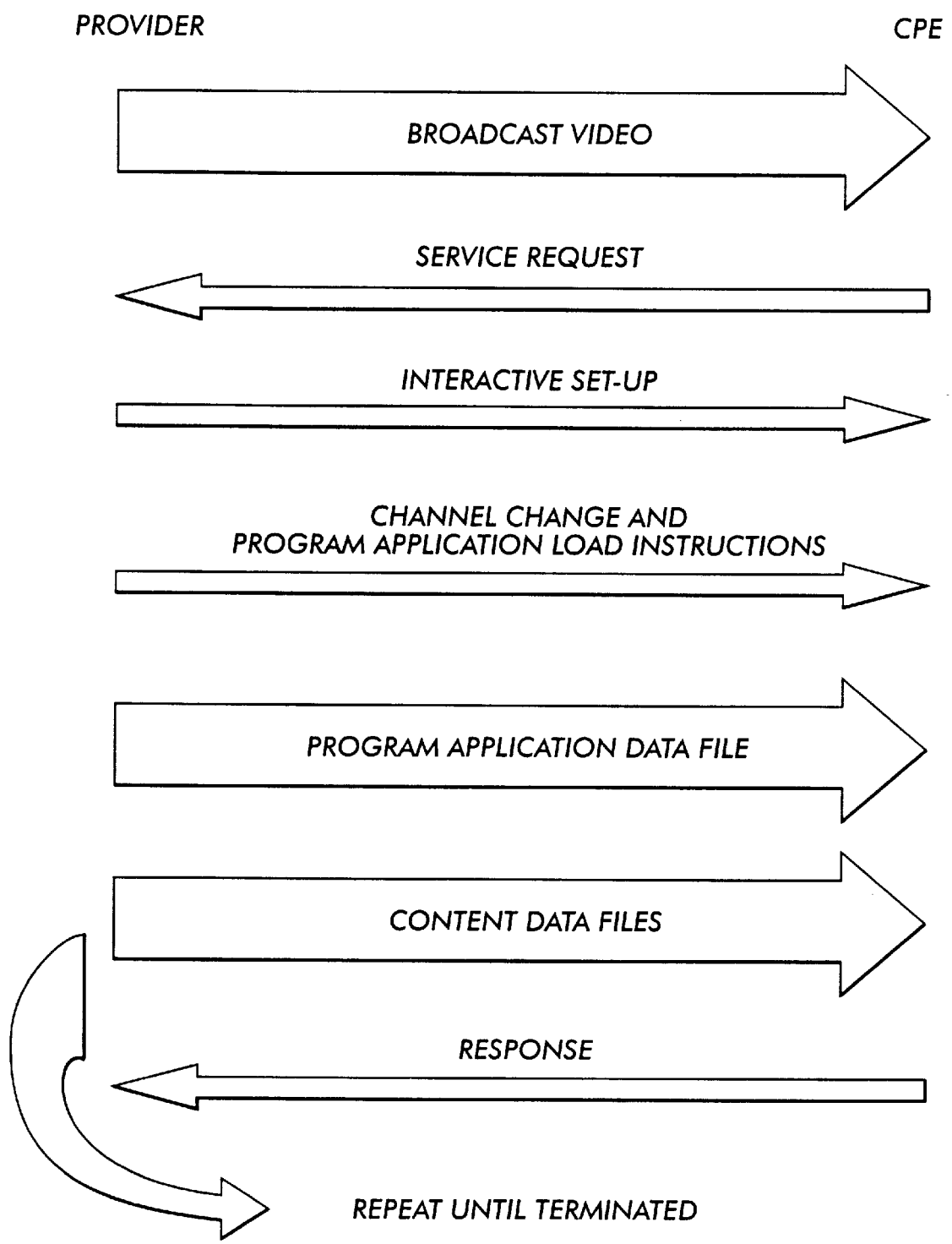

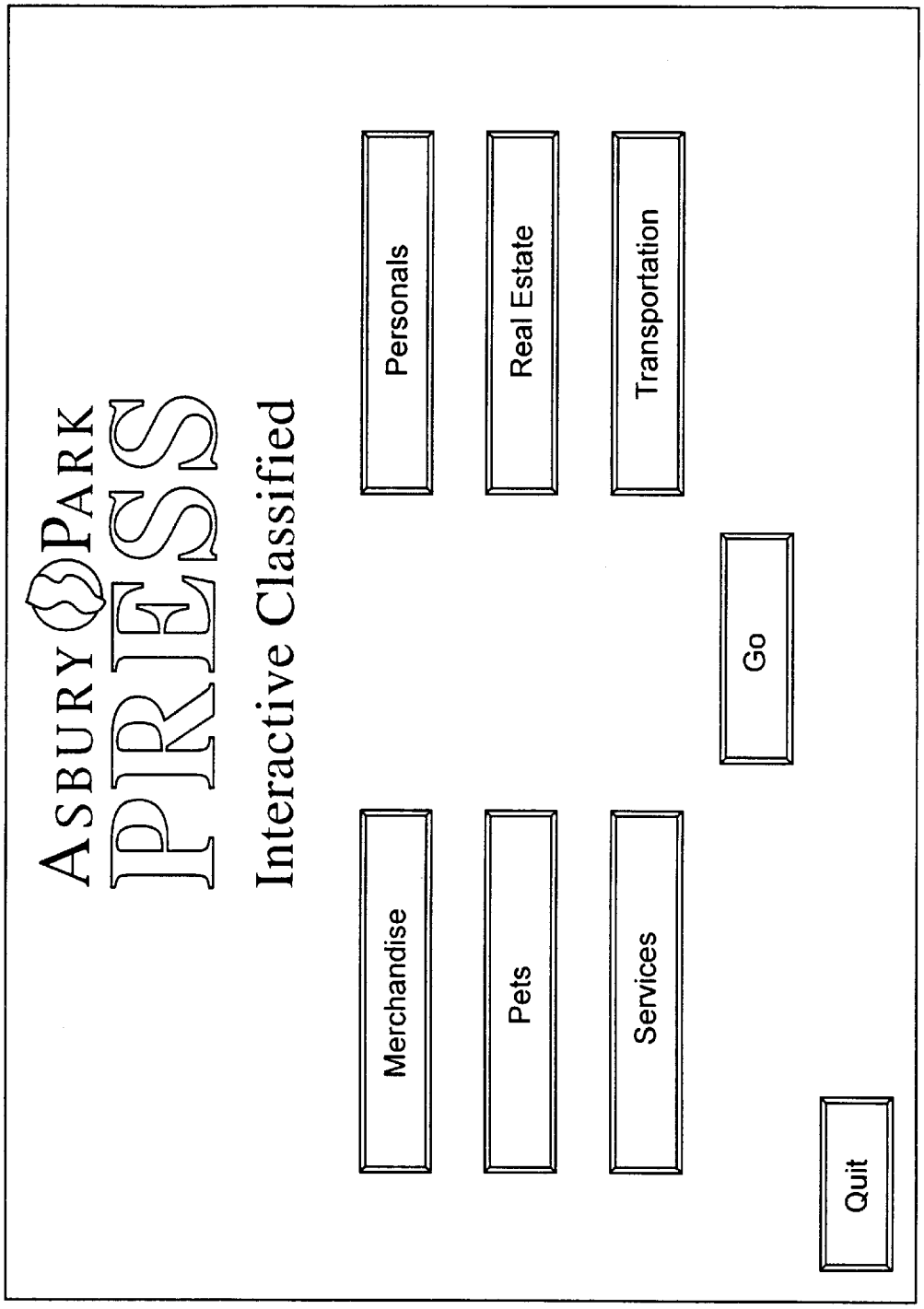

INTERACTIVE BROADBAND MULTIMEDIA SYSTEM

This application is a continuation of Ser. No. 08/567,722, filed Dec. 5, 1995, now abandoned, which is a continuation of Ser. No. 08/255,678, filed Jun. 8, 1994, now abandoned.

FIELD OF THE INVENTION

The present invention is directed to interactive television systems. In particular, the present invention is directed to interactive television systems which facilitate the transmission of control signals through interactive media, and which can be delivered to an end user station such as a television receiver or computer work station.

BACKGROUND OF THE INVENTION

The present invention is directed to interactive television systems. In particular, the present invention is directed to interactive television systems which may be used to facilitate two-way communication between an end user and a provider center or service and which can be used to broadcast data files which may be accessed by a locally stored program to be displayed on a monitor as one or more presentations. The prior art has disclosed systems and devices which facilitate interactive television presentations.

Such prior art systems are characterized by the inclusion of dedicated phone or transmission lines or expensive hardware. The use of such dedicated systems drastically increases the cost associated with the use of such systems.

The PRODIGY® information service, which is marketed widely by Sears® and IBM® claims to use a distributed database architecture. However, that system only distributes the database to regional main frame computers. The underlying technology still relies on the maintenance of continuous real time two-way communication by a personal computer. Nearly all videotex services use phone lines and modems to link the two, although some experiments with two-way cable television and other media have been attempted. Such systems have exhibited numerous limitations.

Because each user of a traditional videotex system is directly connected to a central main frame computer when "on-line", the central computer must be capable of simultaneously handling the many subscribers it gets during prime usage periods. The central computer may sit idle the rest of the time. If there is a problem with a central computer or communications net linking it to the end users, the entire system may cease functioning. Thus, prior art systems have typically relied upon a computer/print interfaces.

The speed with which information may be retrieved in such systems is limited to the speed with which the central computer can recognize a user's request and locate the information in a central data storage media. Even the largest and fastest of central computers cannot overcome the limitations of how quickly information may be carried by the phone lines or other media that connect it to the user. Phone lines typically have a narrow bandwidth and can carry only a limited amount of information. Typical phone line communications are limited to a speed of 2400 baud.

The newer Integrated Services Digital Network (ISDN) and fiber optic cable technologies provide greater information transmission capability. However, even with high speed fiber optics which connect the central computer to a home terminal, the largest computers cannot keep up with an entire city, particularly during prime hours. These systems rely upon the single interaction of a computer and computer.

The bandwidth issue has never been adequately addressed because until recently all computer interfaces were just character-based or used very low resolution alpha mosaic-style displays utilizing protocol such as NAPLPS or TELETEL. Because these systems do not use attractive graphical interfaces, they are not pleasing to the eye. Graphical user interfaces have become very popular because they are far more interesting and easier to use. Such systems utilize much more memory storage space.

There are a number of prior art patents directed to interactive communications systems. U.S. Pat. Nos. 5,093,718 and 5,220,420 are directed to Interactive Home Information Systems. These patents disclose systems which incorporate a nodal structure which feeds in a broadband signal. The nodes are dedicated computers which reside outside of a house or group of houses. The nodes couple to head end computer which is preferably an industrial microprocessor-based controller with high capacity magnetic or optic read/write storage devices.

U.S. Pat. No. 5,233,436 discloses an interactive video system having a display for displaying camouflaged information which is discernible only when viewed through a partially transparent viewing screen having zones with light transmission characteristics corresponding to the characteristic of respective displayed image regions. The user of the system is required to input information which can be derived only by recognizing the camouflaged information with the aid of the screen.

Finally, U.S. Pat. No. 4,745,559 discloses a data transmission system in which data templates are downloaded so as to facilitate data transmission and storage. This patent uses a system in which storage templates are locally retrieved and are associated with a unique identifier. The database records are stored locally and are updated from a remote location.

Each of the above systems requires dedicated hardware as shown for example in U.S. Pat. Nos. 5,093,718 and 5,220,420 or the maintenance of a locally stored database. It would be desirable to provide a system in which interactive data could be broadcast to many customer premise equipment devices (CPE). Such devices could obtain control, graphical and audio data by recognizing and accepting specific data files within broadcast data streams and acting upon the data files such that the viewer would achieve the simulation of an interactive television system. The system would broadcast data files which would be selectively retrieved by the individual viewer on a CPE. The files would be broadcast to all CPE'S in the system. The executing program could become resident and active at the CPE by being loaded from a data stream within a broadcast video channel; a data stream within a broadcast data channel; a pointcast data signal directed to a specific CPE or memory storage within the CPE. End user responses could be transmitted back to the provider using the network return data path. In this way, new files could be broadcast through the system such that the system could access the new information.

SUMMARY OF THE INVENTION

The present invention is directed to a method for facilitating interactive television by an end user comprising the following steps: accessing a computer program for an interactive television display; executing said interactive program so as to provide at least one screen display; and providing a set of broadcast data files which may be accessed by said interactive program.

In a preferred embodiment, the present invention is directed to an apparatus for facilitating interactive television comprising: means for accessing an interactive television application program and presentation a plurality of broadcast data files; and means for controlling said program and broadcast files broadcast on a television monitor.

In yet a further embodiment, the present invention is directed to an apparatus for facilitating interactive television comprising: means for processing an interactive television application program said program being pre-stored in said computer memory; means for accessing broadcast data files, each of said files corresponding to a presentation, and having an identification system associated therewith; and means associated with said end user station for transmitting a set of instructions to a remote location to control the broadcast of new data files.

BRIEF DESCRIPTION OF THE FIGURES

FIG. 5 is a flow chart of an interactive service in accordance with the present invention.

FIGS. 6–8 are screen displays in accordance with the present invention.

DETAILED DESCRIPTION OF THE PREFERRED EMBODIMENT

The present invention is described with reference to the enclosed Figures wherein the same numbers are utilized where applicable. In a broadest embodiment, the present invention is directed to a network having downstream broadcast capabilities, upstream interactive communication capability and a microprocessor-based CPE (Customer Premise Equipment) capable of loading and executing a core program and accessing broadcast data files. The present invention accesses specific data files which are broadcast and which correspond to video, textual and/or audio presentation.

Figure 1:
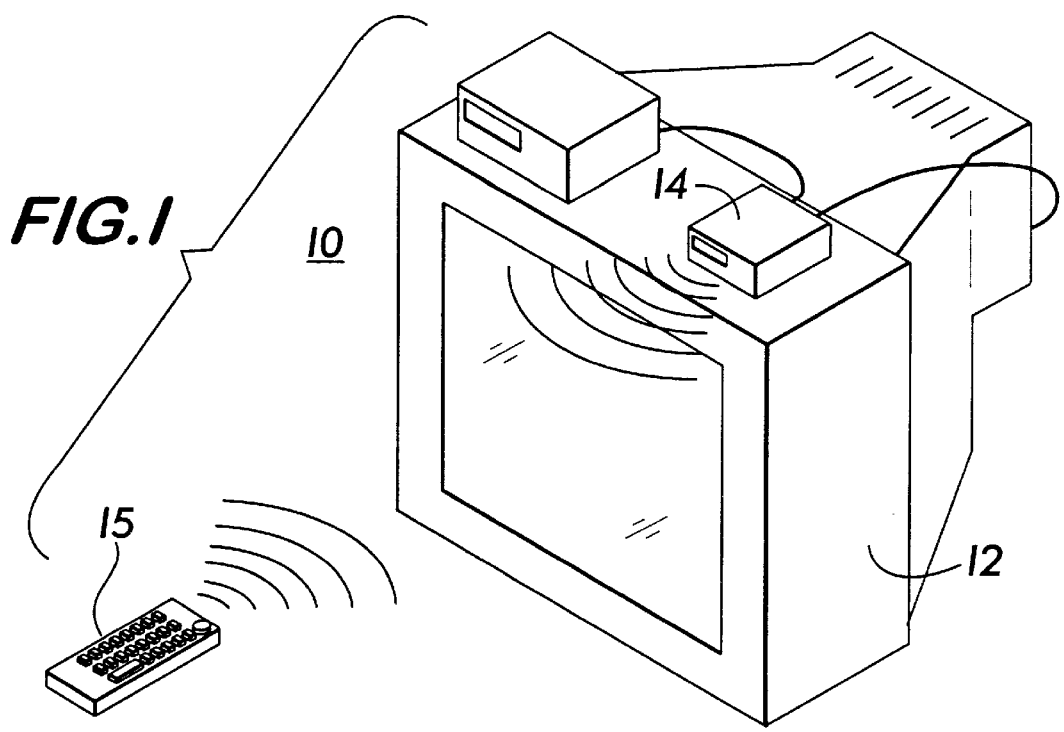
FIG. 1 is a perspective view of an interactive control system in accordance with the present invention.

Referring to FIG. 1, an interactive system of the present invention is described. As shown, in a most preferred embodiment of the present invention, the system 10 of the present invention is utilized in association with a television monitor 12 and end user control 13. End user control 13 may be accessed via a hand-held infrared controller 14. The system 10 of the invention, in a first embodiment, is housed in a control box or customer-premised equipment (CPE) 14. The box 14 is preferably a set-top control box connected to the television. The control box 14 is controlled by IR controller 15. In a most preferred embodiment shown in FIG. 4, the CPE 14 comprises a CPU central processor 16, memory 18, I/O ports 20 and operating system 21. The CPE accesses data files which are broadcast.

Figure 2:
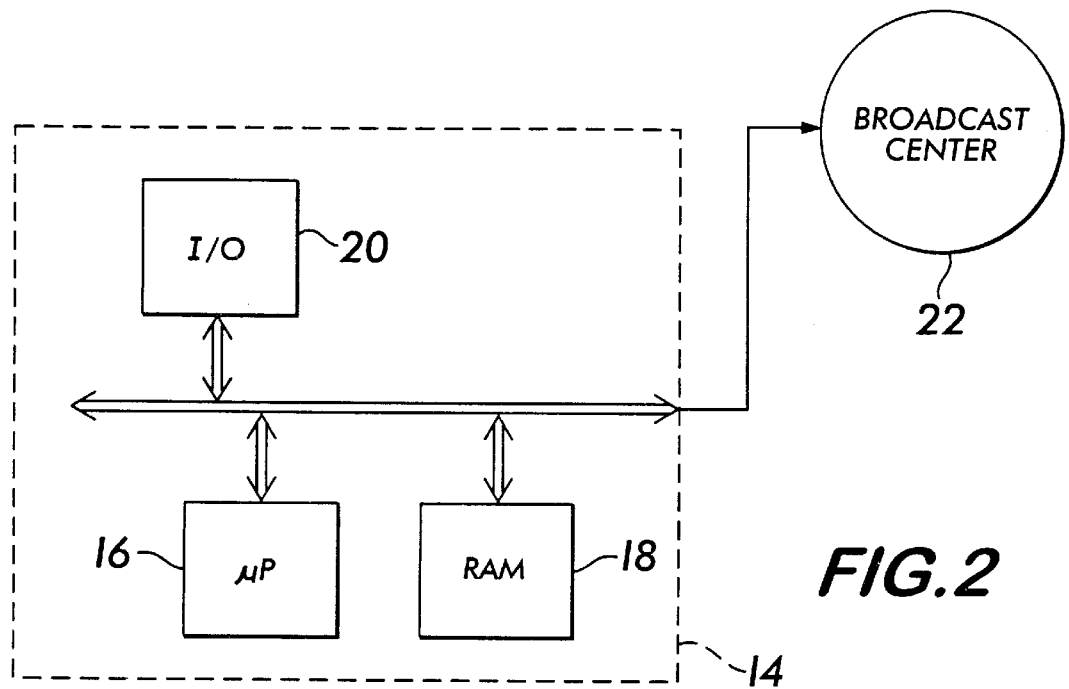
FIG. 2 is a block diagram of an interactive television system in accordance with the present invention.
Figure 3:
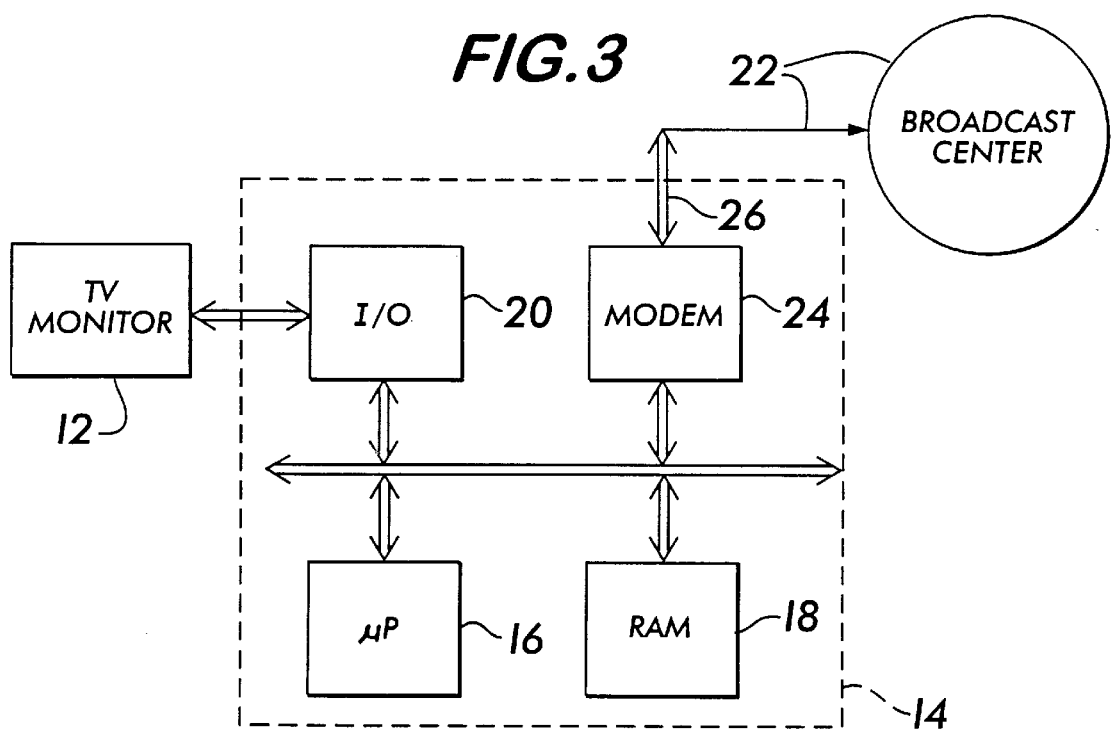
FIG. 3 is a block diagram of an enhanced interactive television system in accordance with the present invention.
Figure 3A:
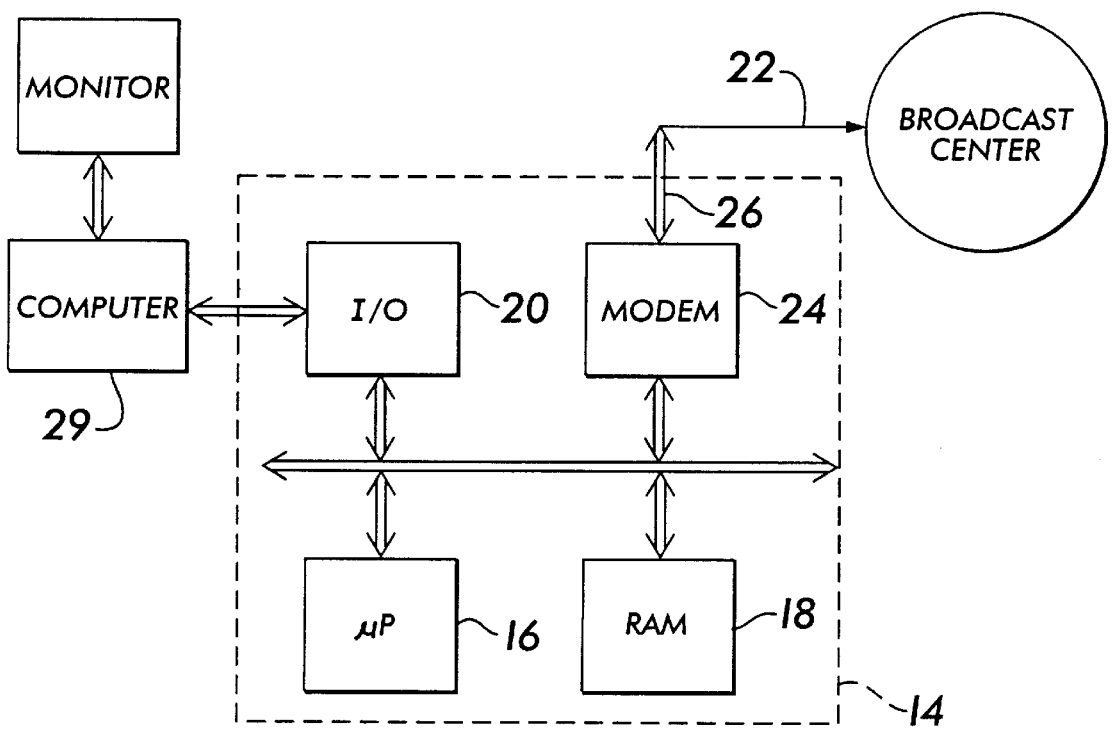
FIG. 3A is a block diagram of an enhanced interactive system in accordance with the present invention which utilizes a computer and monitor as a presentation system.

The control box 14 or customer-premised equipment (CPE) includes circuitry for facilitating the receipt and storage of an interactive core program. As shown in FIGS. 2 and 3, the control mechanism in a preferred embodiment is a microprocessor-based control system. The system incorporates microprocessor 16, RAM 18 which processes a core program and chooses broadcast data files and an input/output device 20 which transmits commands to the set-top control box. As shown in FIG. 3, the device may include a modem 24 connected to the broadcast center 22 via a telephone line 26. The modem can connect to a broadcast center such that a new program or set of data files can be broadcast. As shown in FIG. 3A, the end user system may comprise a computer and monitor 29 rather than a television receiver. The present invention contemplates accessing a core program which facilitates the receipt and control of data files. Each data file represents a presentation.

The present invention contemplates several mechanisms for delivering the core program data to the CPE 14. Initially, the core program may reside on the CPE 14. In addition, the program may be transmitted from a data stream within a broadcast data signal associated with a broadcast video channel. Alternatively, the CPE device 14 may be switched to a broadcast data channel and the program pointcast from a data stream within the broadcast channel.

The core program identifies, loads and executes specific data files which are broadcast. The data files are displayed as textual information still visual audio information based upon specific control elements within the data file. The data files are broadcast. The program may need to switch among different broadcast channels in order to locate the desired data files.

In a preferred embodiment, the data files are obtained by the core program from a broadcast data signal associated with a broadcast video channel and a broadcast data signal associated with a broadcast data channel. The core program is instructed which data file identification number (ID) to identify and execute by the previous executed data file or a control command from the provider delivered by the network's interactive communications system. Hence, the core program facilitates the receipt of files from the broadcast.

When the beginning of the desired data file is identified in the broadcast data stream, for example, by a header ID, that file is acted upon by the program application. Each file will typically contain a still frame image and software for controlling the selection of new files broadcast. Thus, for example, a presentation is provided which queries the user to make an additional selection. The user may select the core program will then search for the selection from the broadcast data files. The file selected will be identified by its file ID and then the video element displayed on the monitor. The program control elements of the data file provide the program application with the instructions necessary to act upon the other elements of the data file. The instructions may indicate that the video element is to be displayed in full or partial screen with a repeating audio element for a specified amount of time.

The number, placement, size of user interface buttons would also be indicated along with the action to be taken upon button selection. Actions may include executing an audio element, displaying a text element, loading and executing additional data files. The actions are activated with the controller. The files may be compressed such using MPEG or other compression technology. In the case of an MPEG compression system, six megabits of data may be transmitted per second. A data file will variable in byte size. Thus over 60 files may be transmitted per second. The core program will identify files by the respective file ID as different files are requested, additional files will be identified by the program. Thus if the file ID is called for, the program will the presentation.

During the program application execution, end user responses are communicated upstream via the instructive call communication return path. This return path may comprise the CATV cable. Alternatively, the path may also comprise a modem dialer affixed to the phone system at the local premises which transmits messages to the central station.

The upstream return instruction is coded to identify all data files being accessed and the end user response thereto. The return information may be used to collect usage, statistics, notification and user requests or purchases. Additionally, the information transmitted by the CPE may dynamically adjust the frequency OF which a specific data file is broadcast by the broadcast data file server. Hence, if subscribers don't request certain information on a frequent enough basis, those files can be deleted from the system.

It is to be noted that the frequency with which a specific data file is delivered in the broadcast stream may be varied based upon an algorithm which determines the likelihood of need by any CPE. The core program may be instructed to identify and load a specific data file prior to it being needed based upon an algorithm which determines the likelihood it will be needed by the core program.

Figure 4B:
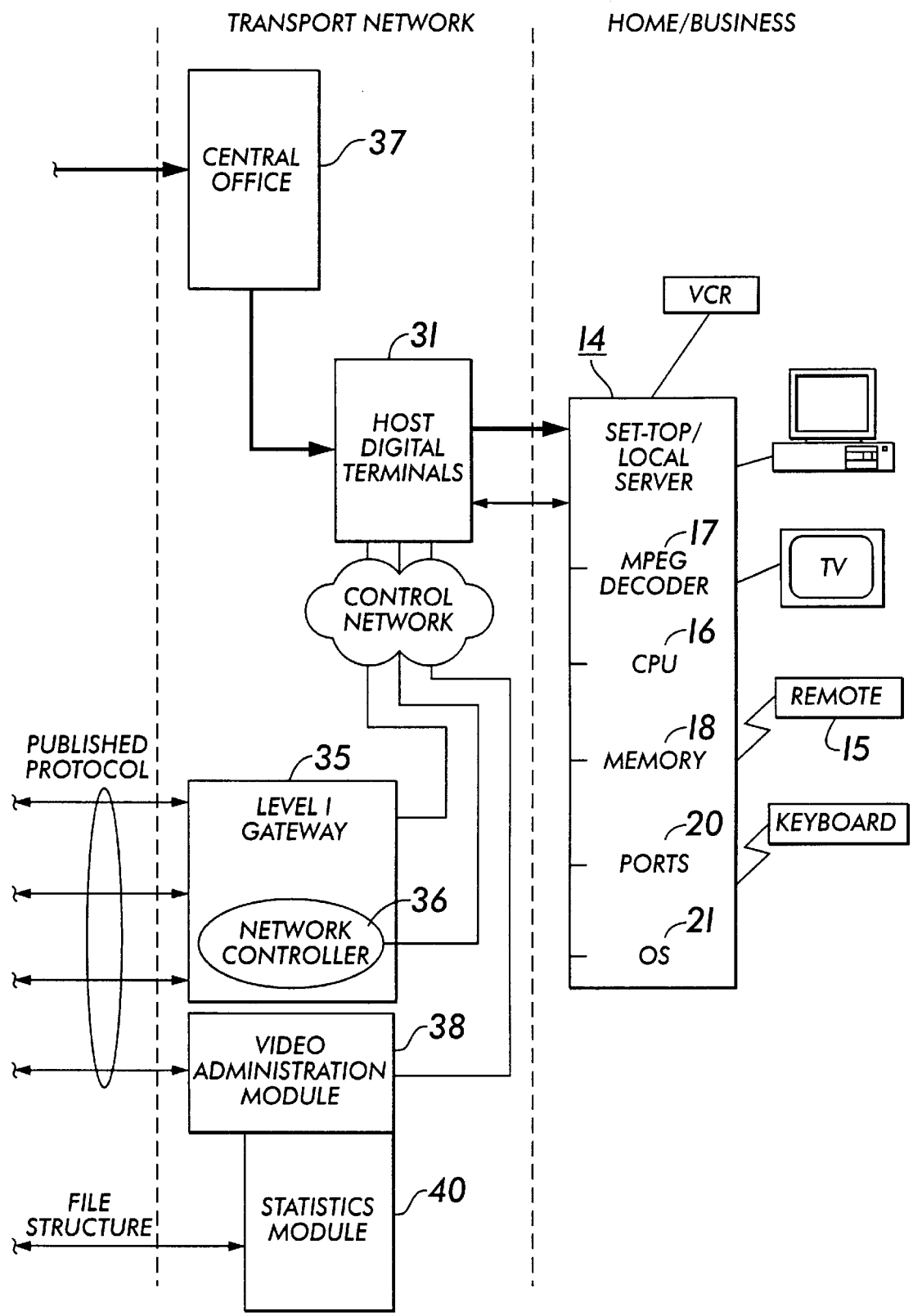
FIG. 4 is a block diagram of an enhanced television network system in accordance with the present invention.

FIG. 4 comprises a more detailed embodiment of the present invention as applied to a communication network. As shown, the system in a most preferred embodiment comprises three principal regions: the home/business; the transport network and the digital integration center. The home or business includes the set top/local server (CPE) 14, an MPEG (decoder) 17, CPU 16, memory 18, ports 20 and operating system 21. While the invention is shown in the context of an MPEG compression system, it is to be appreciated that other compression technologies may be used with the present invention.

The local CPE 14 communicates with a transport network including host digital terminal 31, a central office 33 and a Level I gateway 35. The host digital terminals are in communication with the gateway 35, CPE 14 and central office 37. The Level 1 Gateway 35 includes a network controller 36, video administration module 38 and statistics module 40.

The third major element is the digital integration center 42. This element includes the API (Applications Program Interface) 44 which includes the level II gateway server 46, text server 48, interactive response server 50, channel provisioning system (EPIC) 52, network coordinator 54 and statistics databases 56. The center 42 may include satellite receivers 58, off-air receivers 60, local origination 62, NVOD players 64, a multimedia applications server 66 and VOD (Video On Demand) server 68. The center also includes an MPEG encoder 70 and ATM encoder and MUX 72. The digital integration center functions as the central broadcast center which broadcasts the data files through the central office and to the individual homes or businesses in the system. The end user may access an interactive presentation via the hand-held controller 15. The core program will be activated. The broadcast signal coming through the home/business will include files which will be accessible through the CPE 14.

FIG. 5 is a flow diagram which displays the operation of the present invention. As shown, a provider transmits a broadcast video signal. A subscriber who desires to engage an interactive session transmits a service request via the hand-held IR controller or by activating buttons on the CPE. The provider then establishes an interactive response session and for example, instructs the CPE to perform a channel change and program application load instructions. The program application data file and the content data files are transmitted to the CPE via a broadcast signal. The subscriber can then query the provider for additional presentations which will be broadcast from the center.

Figure 6:
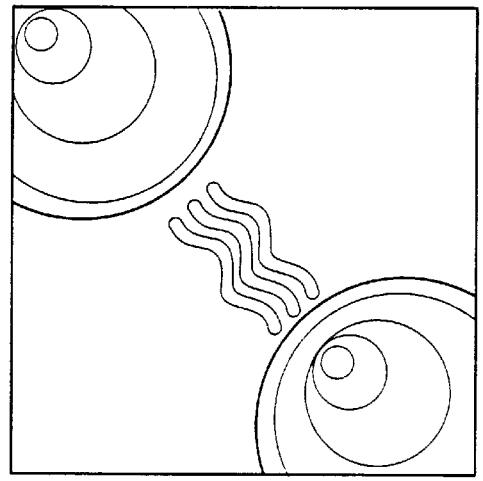
Figure 7:
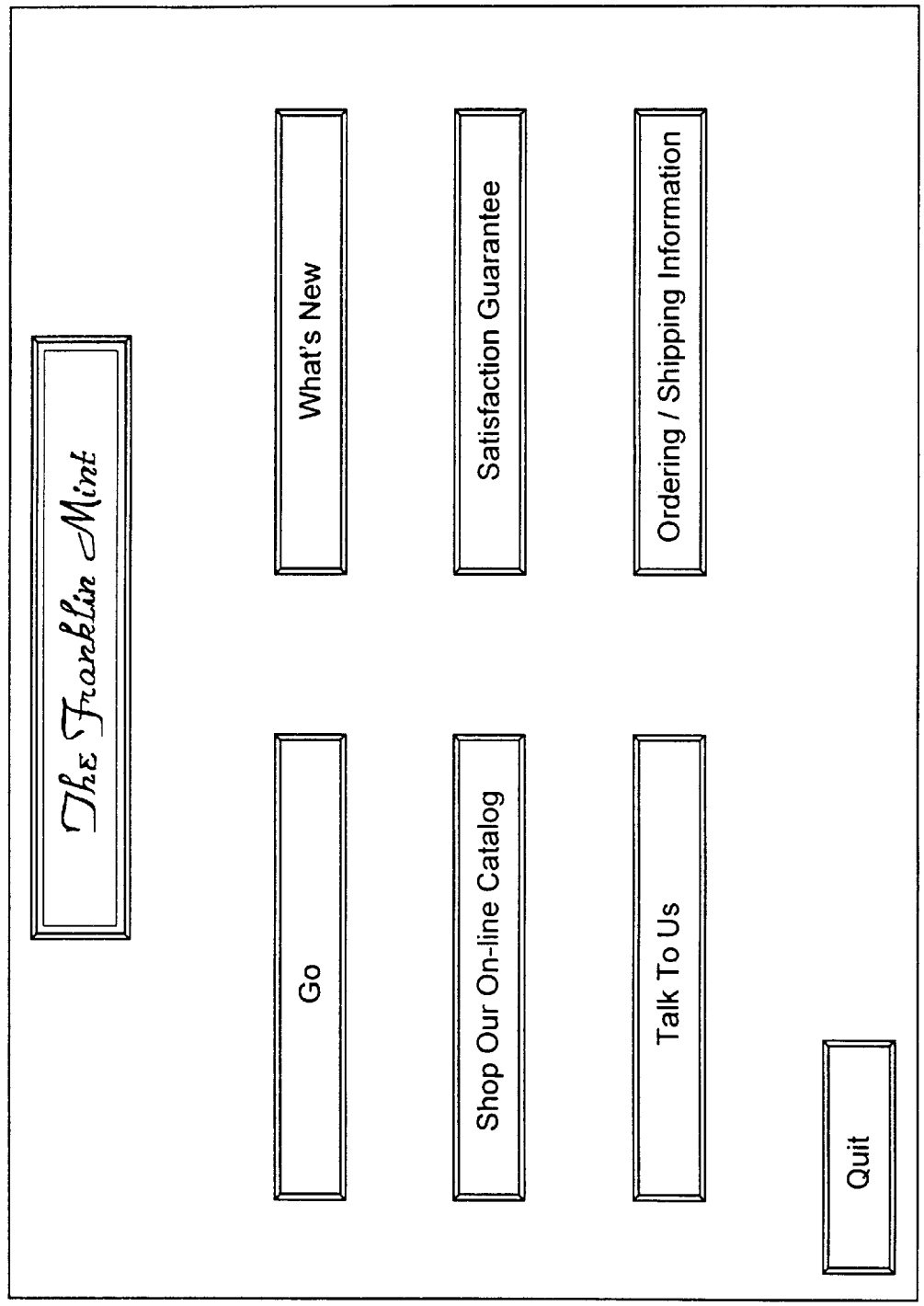

Referring to FIGS. 6 through 8, examples of interactive presentations are shown and disclosed. Initially, the subscriber will input the interactive command in the controller. This can be accomplished by sending a signal or command to down-load the interactive presentation. The command can be input either with the hand-held tuner or by the activation of a button on the control box or CPE. In the following example there are three interactive presentations which are presented on the television monitor. A first is for the Asbury Park Press. A second is for the Franklin Mint. The third is for SHOP RITE Supermarkets.

Each of the presentations has an associated file number which is used to identify the presentation in the broadcast stream.

Referring to FIG. 6, the screen for the Franklin Mint is disclosed. The screen shows an advertisement for the Franklin Mint with a plurality of access items including an on-line catalog, a satisfaction guarantee, ordering and shipping information as well as a screen for new information.

The user will activate the particular presentation desired which will draw in a broadcast data. The presentation selected may be displayed. Additional screens may be accessed from the broadcast and shown on the screen. Further information may be accessed by transmitting a signal upstream. Additional information may then be broadcast to the CPE 14. It is to be noted that information does not have to be received upstream before the next file is accessed.

FIG. 8 provides an example for incorporating a newspaper such as the Asbury Park Press into the system. In this example, the Asbury Press would provide a series of interactive presentations to subscribers of the system. These interactive presentations could include, for example, merchandise, pets, services, personals, real estate and transportation. A subscriber who, for example, desires to view a real estate presentation will activate the real estate command via the hand-held controller.

A real estate presentation will then be shown to a subscriber on the TV monitor. If additional information is requested, a command can then be transmitted on the return path, by the IR controller for example. The command alternatively could be transmitted via a modem, and additional presentations may then be broadcast and presented on the screen.

In yet a further example, a consumer may watch a program such as "CNN Money Line" in which a well known mutual fund manager may be describing the investment strategy of the fund. A text overlay will be displayed querying the consumer if he would like to have additional information via an interactive application.

By responding affirmatively using the remote control 15, the present invention will automatically switch the user to the application and later switch the consumer back to the original program when he is finished with the application. During the application, additional information can be given to the consumer is broadcast to the consumer in the form of files. If the consumer transmits a signal upstream, information on the consumer can be collected and transactions can be completed.

The examples of effective uses include services, products, information, insurance, travel. The ability to target interactive promotions, advertisements, and marketing efforts is enormous. The invention can identify consumers by demographics, geography, or programming viewing preferences.

The present invention has been described with reference to the above-detailed description. It is to be appreciated that other embodiments fulfill the spirit and scope of the present invention and that the true nature and scope of the present invention is to be determined with reference to the claims appended hereto.

I claim:

1. In an interactive television network including a central broadcast server and a microprocessor-based customer premise equipment, including a processor, a memory, and a subscriber interface, a method for delivering a multimedia data file corresponding to an application core program from the central broadcast server to the microprocessor-based customer premised equipment, said application core program comprising logic, the method comprising:

storing the application core program file in the memory;

transmitting a signal from the microprocessor-based customer premise equipment to the central broadcast server representing a request for the multimedia data file;

downloading the multimedia data file from the central broadcast server to the microprocessor-based customer premise equipment;

storing the multimedia data file in the memory; and executing logic in application core program file.

2. A method for interactive broadcasting of multimedia information from a digital integration center comprising a central broadcast server and an interactive response server to a microprocessor-based customer premise equipment comprising a memory, a central processing unit, and a subscriber interface, in communication with said digital integration center, comprising the steps of:

selecting at least one core program file and at least one multimedia data file from the central broadcast server, broadcasting the core program file and the multimedia data file from the central broadcast server to the microprocessor-based customer premise equipment, receiving the core program file in the memory, loading the core program file into the central processing unit, executing the core program file in the central processing unit, obtaining an interactive command information from a subscriber via the subscriber interface, sending the interactive command information from the subscriber interface to the interactive response server, and selecting at least one core program file and at least one multimedia data file corresponding to the interactive command information.

3. A method of claim 2 further comprising the step of sending at least one core program file and at least one multimedia data file from a provider to the central broadcast center.

4. A method of claim 2 further comprising the step of playing said multimedia file on an end user station in communication with the microprocessor-based customer premise equipment.

5. A method of claim 4 wherein said end user station is either of a television, a computer, a video-cassette recorder, a keyboard, or a hand-held controller.

6. A method of claim 2 wherein said multimedia data file is at least one of a video, a textual, or an audio presentation.

7. A method of claim 2 wherein said microprocessor-based customer premise equipment is a set-top box in communication with a television.

8. A method of claim 2 wherein the digital integration center further comprises a statistics database in communication with a statistics module, wherein the step of sending the interactive command information further comprises the steps of receiving the interactive command information in the statistics module and storing the interactive command information in the statistics database.

9. A method of claim 8 wherein the step of selecting at least one core program file and at least one multimedia data file corresponding to the interactive command information further comprises the step of dynamically adjusting either of a broadcasting frequency or a likelihood of need for a multimedia data file based upon an algorithm logic in the core program file and the interactive command information.

10. A method of claim 2 wherein said core program file contains user options for downloading and executing additional presentations while the said core program file or multimedia file broadcast is being displayed.

11. A method of claim 2 further comprising the step of displaying an interactive option during a broadcast comprising a text overlay querying a subscriber for additional information via said subscriber interface.

12. A method of claim 2 further comprising pointcasting the core program file and the multimedia data file from the digital integration center to a specific microprocessor-based customer premise equipment, comprising the steps of broadcasting a selected core program file and a selected multimedia data file from the digital integration center to a specific microprocessor-based customer premise equipment, attaching CPE identifying information to the interactive command information, broadcasting additional selected core program file and additional selected multimedia data file to the specific microprocessor-based customer premise equipment, and identifying additional selected core program file and additional selected multimedia data file with the specific microprocessor-based customer premise equipment and CPE identifying information.

13. An interactive system for broadcasting multimedia information comprising a digital integration center comprising a central broadcast server comprising at least one core program file and at least one multimedia data file a downstream broadcast communication gateway in communication with said central broadcast server, capable of broadcasting said core program file and said multimedia data file, an interactive response server in communication with said central broadcast server, capable of controlling said central broadcast server based upon an interactive command information, an upstream interactive communication gateway in communication with said interactive response server, and a microprocessor-based customer premise equipment in communication with said digital integration center comprising a memory for receiving said core program file and said multimedia data file from said downstream broadcast communication gateway, a central processing unit for loading said core program file from said memory and executing said core program file, and a subscriber interface for obtaining interactive command information from a subscriber and sending said interactive command information to said upstream interactive communication gateway.

14. A system of claim 13 wherein said central broadcast server is capable of receiving at least one core program file and at least one multimedia data file from a provider via at least one receiver in communication with said central broadcast server.

15. A system of claim 14 wherein said receiver includes at least one of a satellite receiver, an off-air receiver, a local originator, a near-video-on-demand player, a multimedia application server, or a video-on-demand server.

16. A system of claim 13 further comprising an end user station controlled by said microprocessor-based customer premise equipment for playing said multimedia data file.

17. A system of claim 13 wherein said end user station is either of a television, a computer, a video-cassette recorder, a keyboard, or a hand-held controller.

18. A system of claim 13 wherein said multimedia data file is at least one of a video, a textual, or an audio presentation.

19. A system of claim 13 wherein said microprocessor-based customer premise equipment is a set-top box in communication with a television.

20. A system of claim 13 wherein said digital integration center further comprises a statistics database containing at least said interactive command information, in communication with a statistics module receiving said interactive command information comprising at least one of usage information, usage statistics, user request information or purchase information.

* * * * *